No. 730,412. PATENTED JUNE 9, 1903.
R. STRAIN.
FRUIT GRADER.
APPLICATION FILED APR. 28, 1902.

NO MODEL.

WITNESSES
Chas. L. Hyde.
Mr. C. Nickelson.

INVENTOR
Robert Strain
BY Hazard & Harpham
ATTORNEYS.

No. 730,412.

Patented June 9, 1903.

UNITED STATES PATENT OFFICE.

ROBERT STRAIN, OF FULLERTON, CALIFORNIA, ASSIGNOR TO FRED STEBLER AND AUSTIN A. GAMBLE, OF RIVERSIDE, CALIFORNIA.

FRUIT-GRADER.

SPECIFICATION forming part of Letters Patent No. 730,412, dated June 9, 1903.

Application filed April 28, 1902. Serial No. 105,116. (No model.)

*To all whom it may concern:*

Be it known that I, ROBERT STRAIN, a citizen of the United States, residing at Fullerton, in the county of Orange and State of California, have invented new and useful Improvements in Graders, of which the following is a specification.

My invention relates to that class of graders designed to assort fruits, vegetables, such as potatoes, and nuts into lots of different sizes; and the objects thereof are to provide a machine for that purpose which is adjustable to a number of grades and which will prevent the fruit from bruising or being crushed. I accomplish these objects by the machine described herein and illustrated in the accompanying drawings, in which—

Figure 1:
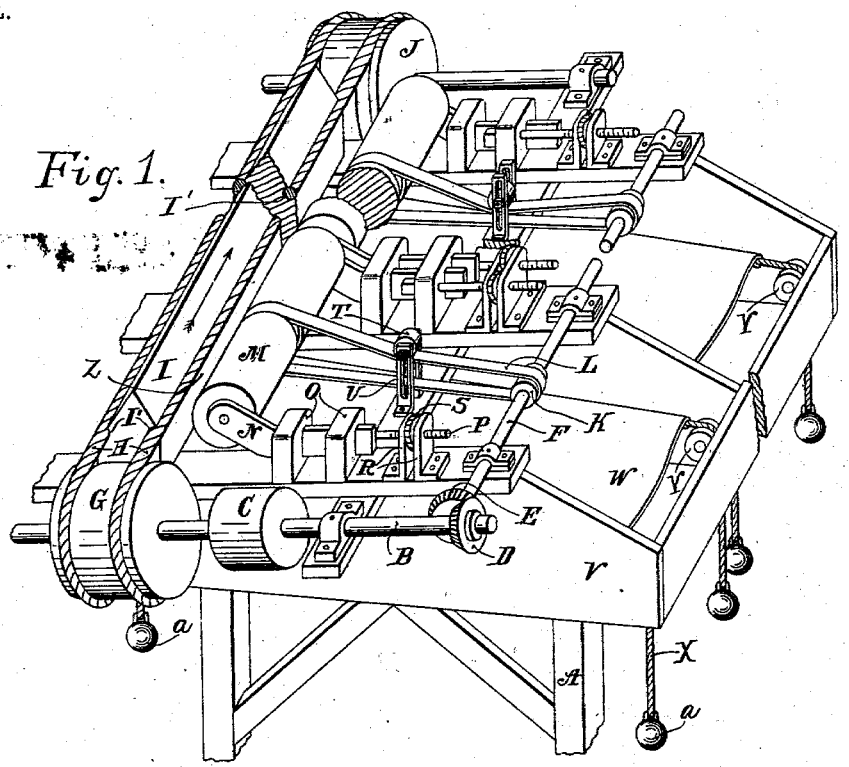
Figure 2:
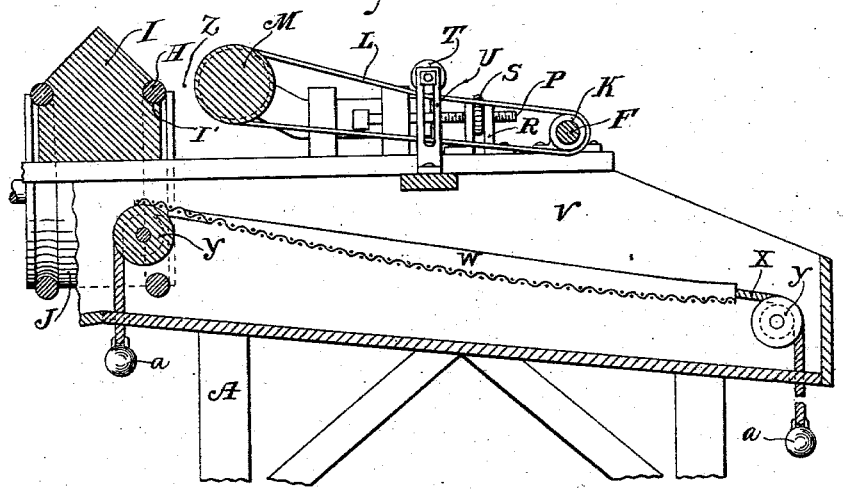

Figure 1 is a perspective view of a fragment of my machine arranged for grading oranges or lemons. Fig. 2 is a cross-section.

In the drawings my machine is designed as a double grader—that is, two graders arranged side by side on the same frame, one side being a duplicate of the other side.

A represents the frame of the machine, on the top of which at one end of the machine, preferably at the upper end, is transversely mounted the driving-shaft B, carrying the driving-pulley C, by means of which motion is imparted thereto. When arranged as a double grader, on each end of the driving-shaft is rigidly mounted driving bevel-gears D, which mesh with driven bevel-gears E, rigidly mounted on the longitudinally-extending driven shafts F. On the driving-shaft is rigidly mounted the rope-driving drum G, which imparts motion to ropes H, which travel in the direction indicated by the arrow in Fig. 1—that is, from head to the foot thereof—in grooves I' in guide I, which forms one side of the fruit-runway. These ropes pass over pulley J at the lower end of the machine. On the driven shafts F are rigidly mounted a number of driving-pulleys K, which drive belts L, that pass around the grading-rollers M, which are revolubly mounted in adjusting-arms N, which have a longitudinal movement in guide-blocks O, affixed to the top of the frame. To each of these adjusting-arms is affixed a threaded bolt P, which passes through two stop-blocks R, between which is an adjusting-nut S on bolt P in threaded contact therewith, by the rotation of which the grade-rollers are moved toward or from the guide. Affixed to the top of the frame are band-tighteners to tighten the bands when the grade-rollers are moved away from the guide. These band-tighteners are formed of a pulley T, adjustably mounted in slotted uprights U, affixed to the frame. Below the grade-rollers are as many bins V as there are grade-rollers, which are adapted to hold the fruit which will pass between the grade-roller and the guide. In order to prevent the fruit from being bruised, in each bin is mounted an apron W, of strong cloth, the inner end of which is higher than the outer, so that the fruit will roll to the outer end of the bin, where it has but a short distance to fall to reach the bottom of the bin. Each edge of these aprons is fastened to a rope X, which passes over small pulleys Y, affixed to the side of the bin, and each end thereof has a weight $a$ to hold the apron taut and to keep it in position. In the operation of my machine the first roller, or that nearest to the shaft B, is adjusted so as to permit the smallest grade of fruit to pass between the roller and guide. The next roller is adjusted for the next larger grade, and so on for each successive grade. In orange grading there are usually nine grades. Motion is imparted to the driving-shaft to cause a rope H to travel in a groove I' in guide I in the direction indicated by the arrow. This causes the grade-rollers to revolve, so that the top of the roller travels away from the guide. The fruit is fed into the runway between the guide and the grade-rollers by any suitable device (not shown) in the usual manner.

It will be observed that as the grade-rollers are adjustable the distance between the roller and guide can be made small or large to adapt the machine to grading small nuts or fruits or large nuts or large fruits. It will also be observed that the ropes carry the fruit toward the lower end of the machine and at the same time the grade-rollers are revolving, so as to keep the fruit from sticking in the runway, thereby avoiding any tendency to crush the most delicate fruit. It will also be observed that the inner end of the apron gives a soft yielding surface for the fruit to fall upon a short distance below the roller, thus preventing any danger of its bruising. As the fruit rolls to the outer end of the apron it falls onto the bottom of the bin, and as the end fills up the apron can be moved toward the inner end of the bin, the weights providing for such adjustment. The fruit is packed from the outer end of the bin. By having short grade-rollers separately adjustable very fine grading may be done, and more than one roller may be adjusted to the same grade, if desired. If there should be a large quantity of the fruit of a single-grade intermixed with a small quantity of fruit of different grades, this feature is very desirable, as a number of bins may be filled with fruit of the same grade.

Having described my invention, what I claim as new, and desire to secure by Letters Patent, is—

1. In a fruit-grader in combination a plurality of independent transversely-adjustable rotating rollers; a non-movable grooved guide lying parallel with the plane which passes vertically and longitudinally through the center of said rollers, said rollers and guide forming a fruit-runway; a rope in the groove in said guide and means to move said rope.

2. In a fruit-grader having a bin means to break the fall of the fruit from the grading-way comprising a yielding soft apron above the bottom of the bin and extending under the grading-way, said apron having the end thereof under the grading-way at a higher elevation than the other end; the lower end extending to near the outer side of the bin.

3. In a fruit-grader, a grooved longitudinal guide; a rope in said groove; means to impart movement to said rope; one or more rollers lying parallel to said guide revolubly mounted in arms transversely adjustable; means to adjust said arms comprising a threaded bolt passing through two stop-blocks; a nut on said bolt in threaded contact therewith between said stop-blocks; and means to revolve each of said rollers comprising a belt passing around said roller and a pulley mounted on a shaft; and means to impart motion to said shaft.

In witness that I claim the foregoing I have hereunto subscribed my name.

ROBERT STRAIN.

Witnesses:
   E. K. BEUCHLEY,
   G. E. HARPHAM.